April 17, 1962 G. DE GELLEKE 3,030,042
WEB-ROLL CHANGING MECHANISMS FOR WINDING MACHINES
Filed June 19, 1959 8 Sheets-Sheet 1

INVENTOR:
GERRIT DE GELLEKE
BY
Robert Henderson
ATTORNEY

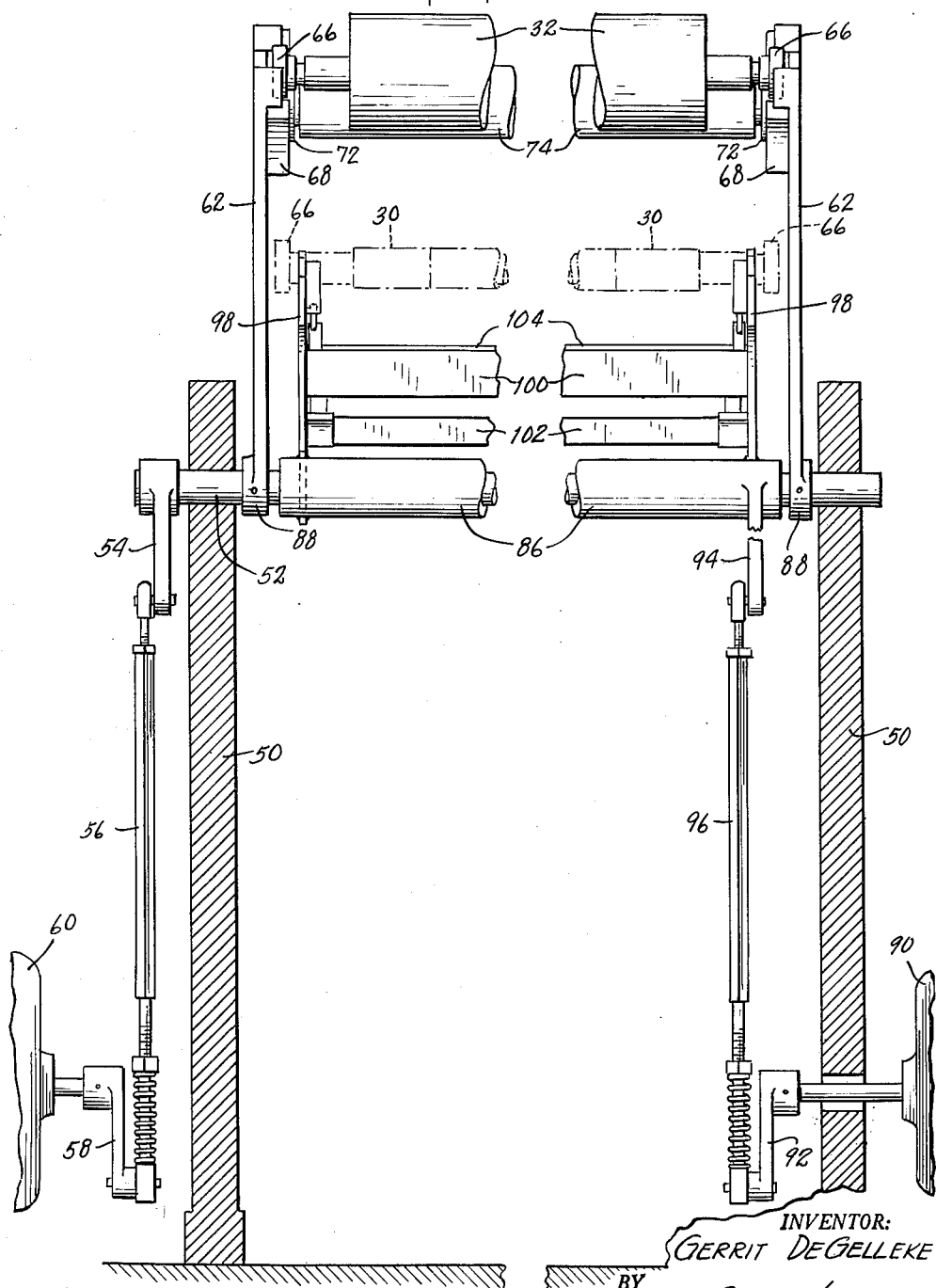

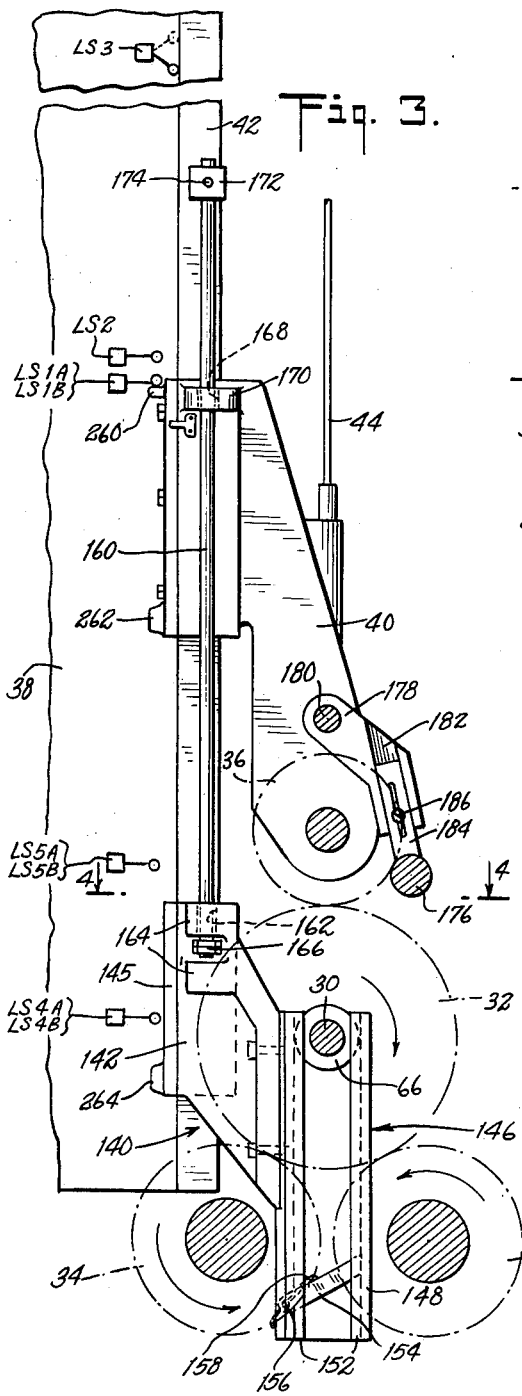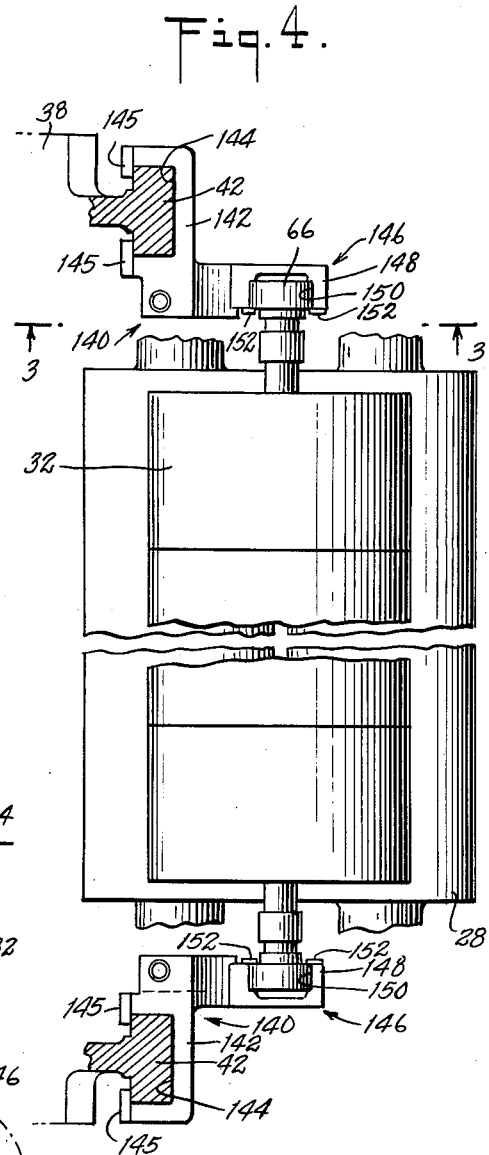

April 17, 1962 G. DE GELLEKE 3,030,042
WEB-ROLL CHANGING MECHANISMS FOR WINDING MACHINES
Filed June 19, 1959 8 Sheets-Sheet 4
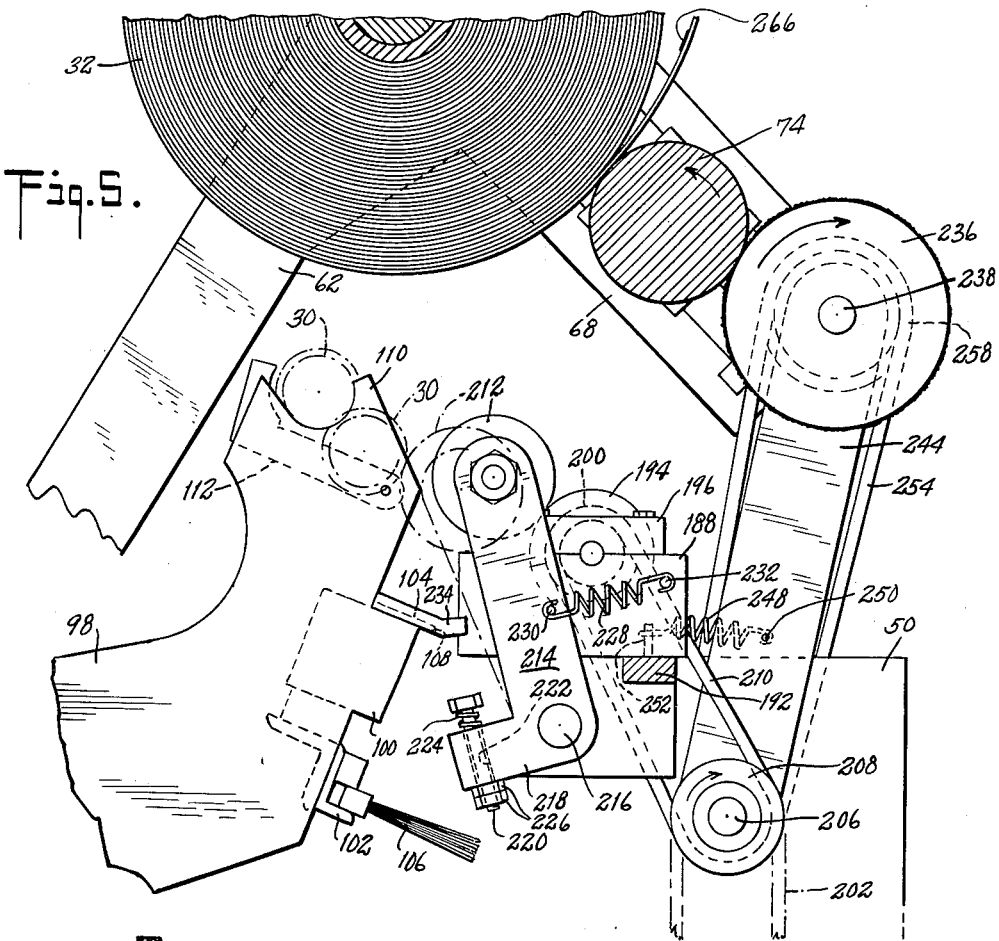
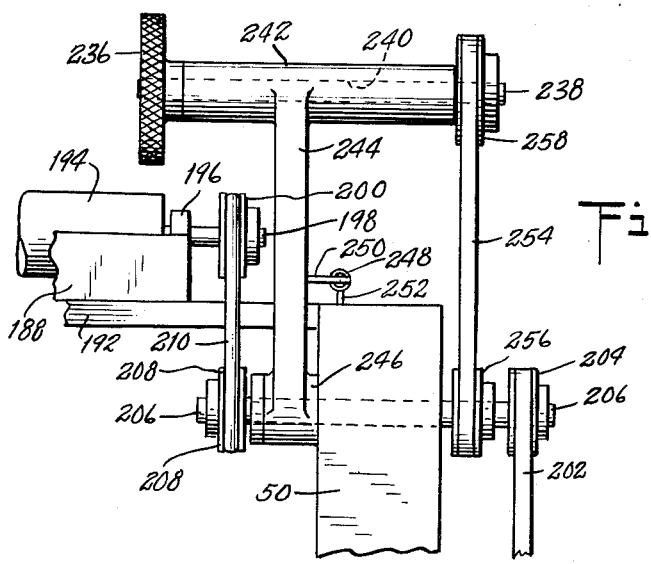
INVENTOR:
GERRIT DE GELLEKE
BY Robert Henderson
ATTORNEY

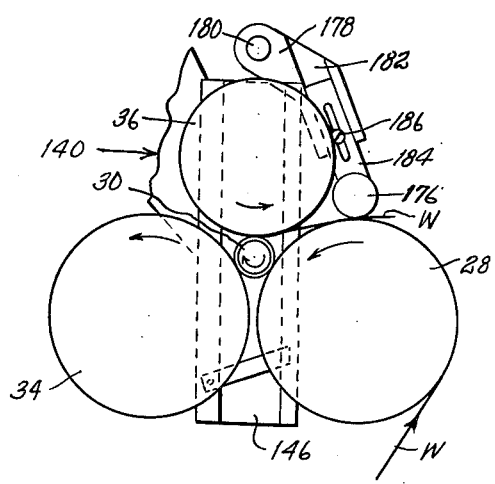
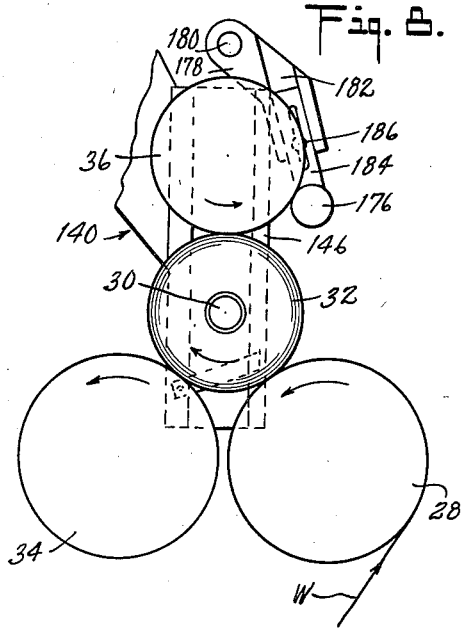
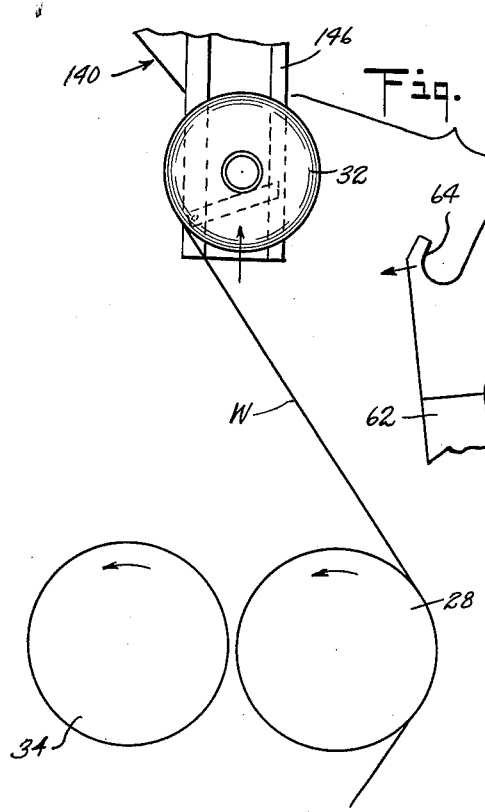
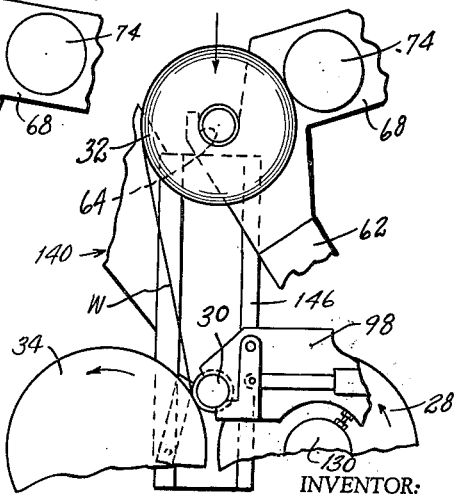
INVENTOR:
GERRIT DE GELLEKE
BY Robert Henderson
ATTORNEY April 17, 1962 G. DE GELLEKE 3,030,042
WEB-ROLL CHANGING MECHANISMS FOR WINDING MACHINES
Filed June 19, 1959 8 Sheets-Sheet 6

INVENTOR:
GERRIT DE GELLEKE
BY Robert Henderson
ATTORNEY

INVENTOR:
GERRIT DE GELLEKE
BY Robert Henderson
ATTORNEY

3,030,042
WEB-ROLL CHANGING MECHANISMS FOR
WINDING MACHINES
Gerrit De Gelleke, Parsippany, N.J., assignor to Cameron Machine Company, Dover, N.J., a corporation of New York
Filed June 19, 1959, Ser. No. 821,395
27 Claims. (Cl. 242—56)

This invention relates to an improved mechanism for automatically removing a filled or fully wound rewind roll from a winding machine and substituting a new rewind-roll core in said machine for accumulation of web material thereon.

Winding machines are often employed to produce, from a relatively thick payout or supply roll of web material, a substantial number of new or rewind rolls of said material which are relatively thin and contain lengths of web material which are considerably less than the length of web material originally provided in the payout roll. The payout roll becomes thinner, of course, and eventually exhaused of web material as the web is drawn from it in repeated forming of thinner new rolls, and is replaced from time to time with new payout rolls.

It should be noted that winding machines are commonly provided with slitting knives or other web-processing mechanisms by means of which the web may be slitted into a plurality of narrower webs on narrower rolls or be otherwise processed as the web material in the winding operation moves from the payout roll to the rewind roll or rolls.

Upon completion of the formation of such a rewind roll, it must be removed from the winding machine and replaced with a new rewind-roll core.

This, hitherto, has been done manually and has been very time-consuming. Thus, it has been necessary for an operator or operators of the machine to manually do the following when the desired amount of web material has accumulated on the new or rewind roll:

(1) Stop the motor which causes the machine to perform its winding operation.

(2) Operates a separate motor which serves to raise, to a substantial extent, a riding roll which is commonly used to rest upon the rewind roll in the machine while the winding operation is in progress.

(3) Sever the web between the payout roll and the rewind roll and paste the web end at the exterior of the rewind roll so that the web material on the latter does not unintendedly become partially unwound.

(4) Remove the rewind roll.

(5) Insert in the machine a new rewind-roll core in the nature of a shaft having thereon one or a series of tubes of cardboard or other material suitable for the reception of web material thereon.

(6) Paste the leading edge of the web, which still remains in the machine, to the new rewind-roll core.

(7) Lower the riding roll upon the new rewind roll by operating the motor provided for that purpose.

(8) Tuck the leading end of the web between the new rewind-roll core and a winding roll or drum of the machine so that the web will start winding upon said core.

(9) Restart the winding mechanism of the machine.

An important object of the present invention is the provision of means, in a winding machine, by which the removal of filled rewind rolls and the substitution of new rewind-roll cores in the machine may be performed mechanically and automatically.

Another important object of this invention is the substantial minimizing of time devoted to such roll-changing with a concomitant increase in the time available for winding operation of the machine.

Another important object is the provision of means for keeping cut web ends under control so that web material on a rewind roll will not unintendedly become partially unwound and so that a leading end of web material coming from a payout roll need not be rethreaded when rewind rolls are changed.

Another important object is the provision of such roll-changing means which will automatically assure that each rewind roll will contain a very close approximation to the amount of web material intended to be wound thereon.

Another important object is the provision of glue-applying means for automatically applying glue to a new rewind-roll core and to the web end or ends of a filled rewind roll.

Another important object is the provision of means for automatically pressing the glued end or ends of webs on a filled rewind roll to the accumulated web material on said roll to prevent undesirable unwinding of web material from the filled rewind roll.

The present invention also achieves other objects which will be more or less obvious upon reference to the present description and the accompanying drawings.

According to this invention, two separate assemblies of rewind roll handling arms are provided; each of said assemblies comprising approximately similar arms at opposite ends of the machine tied together by a transverse rock-shaft constraining said arms to pivot in unison. The ends of the arms of each of said assemblies are adapted to receive the ends or bearings at opposite ends of the rewind rolls.

One of said assemblies of arms, which may be considered as unload arms, is arranged to pivot from an "out" position, clear of all rolls involved in a winding operation of the machine, to an "in" position in which the ends of said unload arms are beneath the bearings of a filled rewind roll that previously has been elevated in the machine. The unload arms are adapted to receive said filled rewind roll, thereafter lowered to said arms, and then to pivot outwardly with the rewind roll to a position in which an operator may readily remove the filled rewind roll from the machine.

The other assembly of arms may be considered as load arms. They are arranged to pivot from an "out" position, in which an operator may conveniently insert a new rewind-roll core, to an "in" position in which the new rewind core is deposited in winding position in the machine. After such depositing of the rewind-roll core in the machine, the load arms are pivoted back to their "out" position in readiness for the reception of another rewind-roll core. The unload arms and the load arms are arranged, of course, so that there is no interference, during their said pivoting movements, between said arms or the rewind rolls or rewind-roll cores which they carry.

The invention also includes automatic web-severing means for transversely cutting the web material between a newly inserted rewind-roll core and a rewind roll which has been partly pivoted outwardly from within the machine.

Within the invention, the improved mechanism includes, also, a glue roll, positioned and arranged to apply glue automatically to a rewind-roll core before the latter is pivoted into the machine, and a glue brush, arranged to apply glue to ends of web material on a filled rewind roll either concurrently with or approximately at the time of severing of the web material on the filled rewind roll from the remainder of the web in the machine.

The accompanying drawings, all of which are more or less diagrammatic in character, illustrate a preferred embodiment of the invention without, however, limiting the invention to the illustrated embodiment.

FIG. 2 is a vertical, sectional view, substantially on the irregular line 2—2 of FIG. 1, certain arms and cranks being shown out of position to illustrate them more clearly.

FIG. 3 is a vertical, fragmentary, sectional view, substantially on the line 3—3 of FIG. 4; a riding roll and its carriage being shown in this figure in correspondingly elevated positions as compared to FIG. 1, said elevated positions having resulted from the accumulation of web material on an underlying rewind roll during a winding operation.

FIG. 4 is a horizontal, sectional, fragmentary view, substantially on the line 4—4 of FIG. 3.

FIG. 5 is an enlarged, fragmentary, vertical, sectional view showing certain parts illustrated in FIG. 1, and fragmentarily showing load and unload arms approximately in their outermost positions.

FIG. 6 is a fragmentary, front, elevational view, toward one end of the machine, of mechanisms shown in FIG. 5 and at the right side of FIG. 1, the showing of FIG. 6 being as viewed from the right sides of FIGS. 1 and 5.

FIG. 7 is a vertical, cross-sectional, diagrammatic view illustrating the relationship of certain rolls in the winding mechanism of the machine and certain portions of the roll-changing apparatus at the beginning of a winding operation.

FIG. 8 is a view of the same general character as FIG. 7 but showing the relationship of parts after a substantial amount of web material has accumulated on a rewind roll, at which time it may be said that a winding operation has been completed and a roll-changing operation is about to commence.

FIG. 9 is a view of the same general character as FIGS. 7 and 8 but illustrating lifting of a filled rewind roll by roll-changing mechanism according to this invention as an early step in a roll-changing operation; this figure also including, fragmentarily, an unload arm at a midpoint of its pivotal movement into the machine.

FIG. 10 is of the same general character as FIG. 9 showing, however, the unload arm in its "in" position, holding the filled rewind roll which has been lowered to the unload arm, and showing, also, a load arm with a new rewind-roll core which it has just pivoted into place in winding position in the machine.

Figure 11:
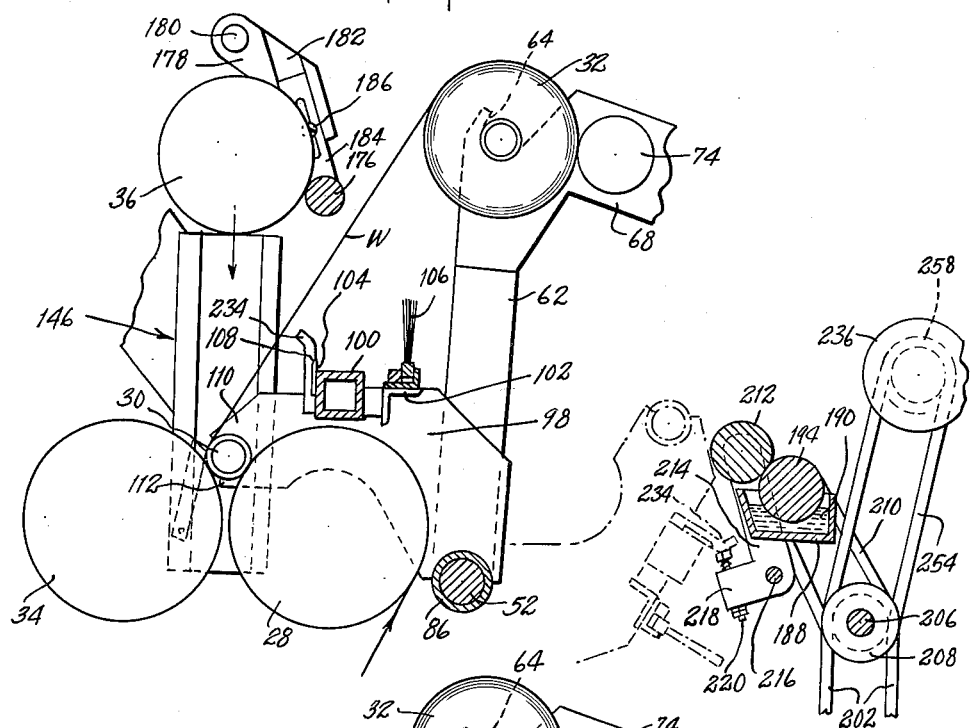
FIG. 11 is a view of the same general character as FIG. 10; but shows the unload arm at about a half-way position on its way out of the machine with the previously filled rewind roll; this figure shows, also, the load arm in broken lines in its full "out" position as in FIG. 5 and, also, a glue-supply mechanism.
Figure 12:
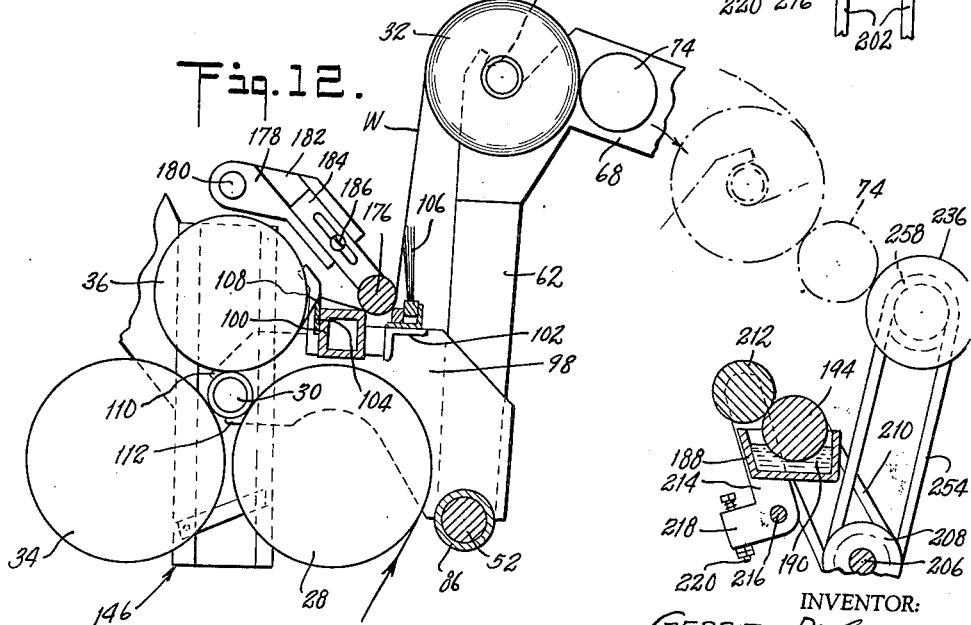

FIG. 12 is a view of the same general character as FIG. 11 but shows, additionally, the riding roll lowered to rest upon the new rewind-roll core, and the manner in which a web-deflecting roll, associated with the riding roll, engages and deflects the web to cause it to have glue applied thereto and to be severed; this figure shows, also, the unload arm in broken lines in its full "out" position as in FIG. 5.

Figure 13:
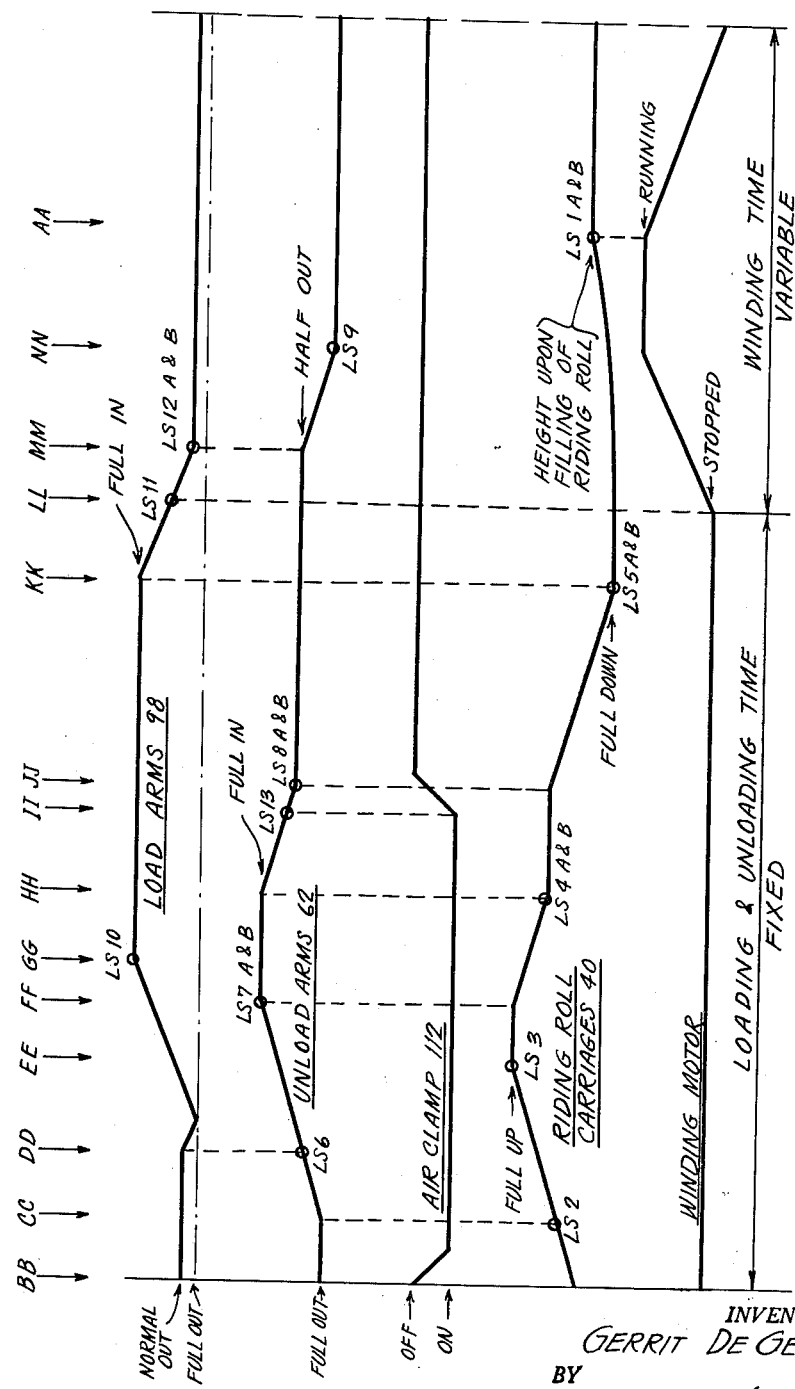

FIG. 13 is a flow-chart showing the relative movements and approximate timing of movements of various parts of the roll-changing mechanism in relation to each other and also indicating the relationship of such movements to certain switches in electrical controls for the machine.

Figure 14:
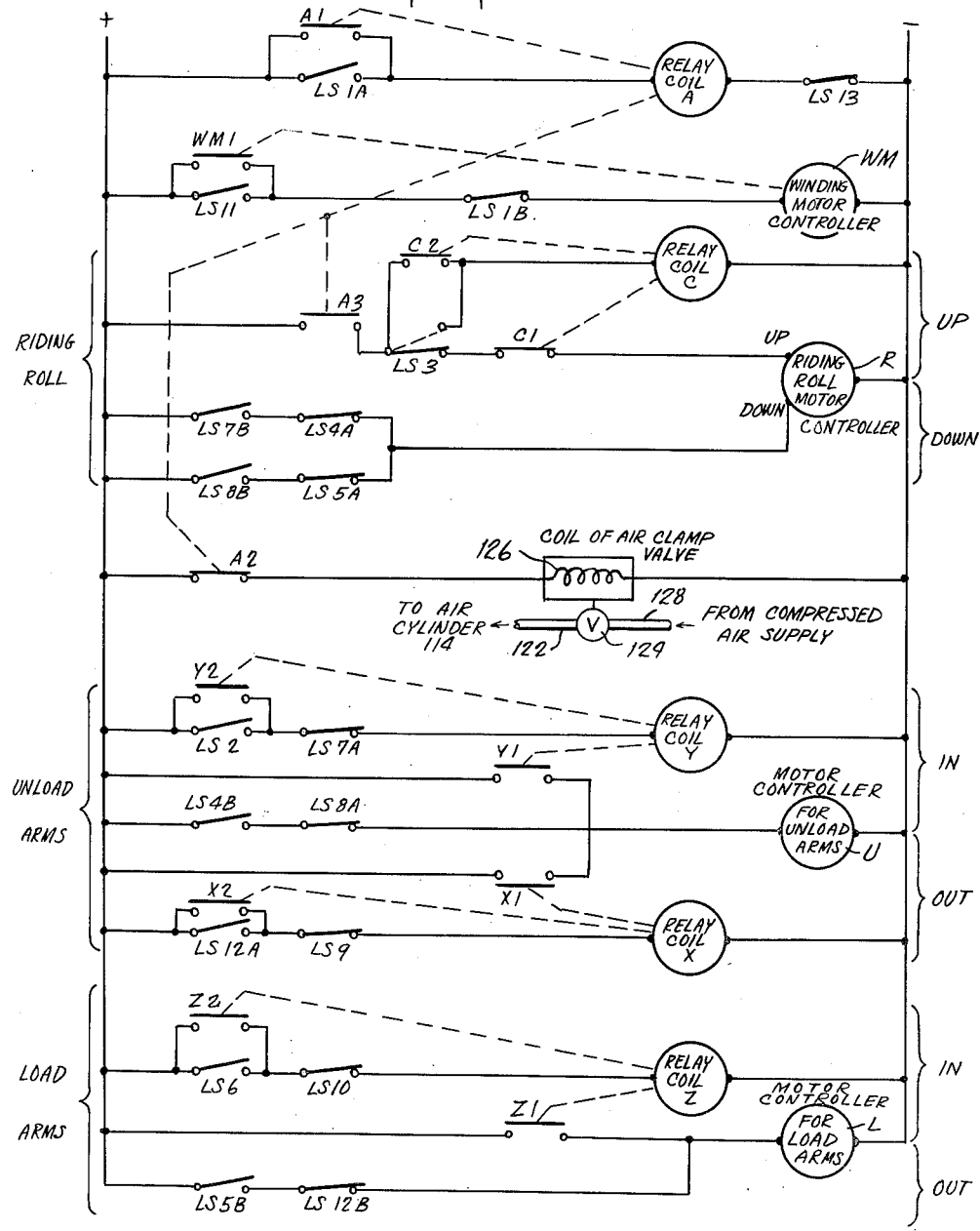

FIG. 14 is a diagram showing electrical instrumentalities and circuits employed to control and operate the valve of a pneumatic clamp and certain motors which, in cooperation with mechanisms illustrated and described, effect automatic roll changing according to this invention; this diagram being limited substantially to automatic control means and omitting means which may be used to operate the electrical apparatus manually and which do not constitute any essential part of this invention.

Figure 1:
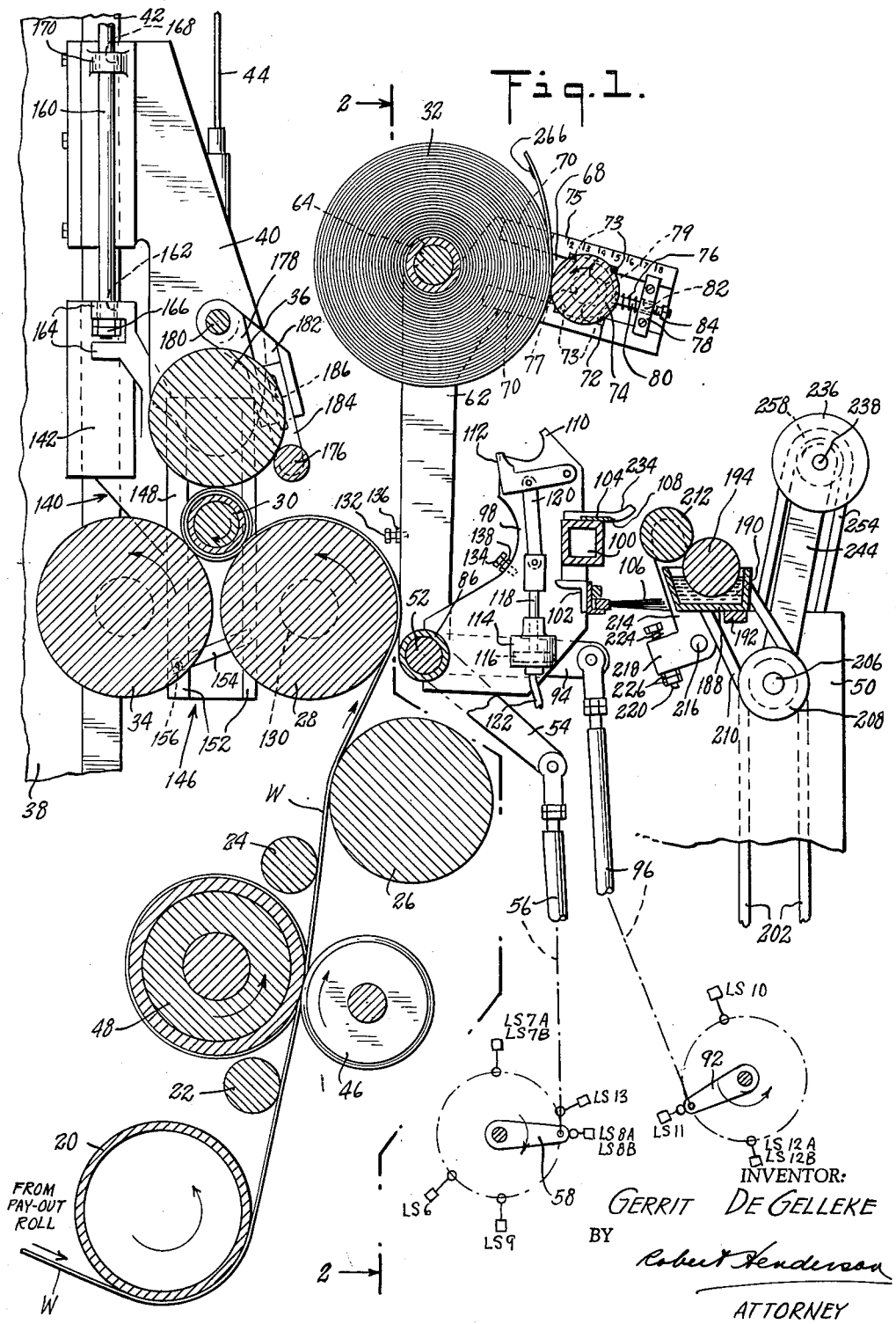
FIGURE 1 is a fragmentary, and partly diagrammatic, central, vertical, sectional view of certain principal parts of a winding machine and of a roll-changing mechanism according to a preferred embodiment of this invention; unloading and loading arms being shown in this view at positions intermediate their extreme "in" and "out" positions as a roll change is nearing completion.

In FIG. 1, there are shown, cross-sectionally, certain rolls of a more or less conventional winding machine arranged to wind web material in a manner well known to persons skilled with respect to winding machinery. Thus, a web W, moving from a payout roll (not shown), in the direction indicated by arrows, passes partly around and in contact with guide-rolls 20, 22, 24 and 26 to and partly around a front winding drum 28 from which it passes to the underside of a rewind core 30 on which it is wound and accumulates to form a rewind roll 32 of substantial thickness, shown also in FIGS. 2, 3, 4, 5, 8, 9, 10, 11 and 12. Such winding is accomplished by frictional engagement of the core 30 (and any web wound thereon) with the front winding drum 28 and a rear winding drum 34, which drums are driven in a well-understood manner by a winding motor (not shown). A vertically guided riding roll 36, which may be suitably power-driven if desired, bears downwardly upon the rewind core 30 to enhance the frictional engagement of the latter with said winding drums for deriving winding rotation therefrom.

The winding drums 28 and 34, and the guide-rolls 20, 22, 24 and 26 are borne at opposite ends in suitable bearings in upright, side frame members, for rotation about fixed axes, one of said frame members being shown fragmentarily at 38 in FIGS. 1, 3 and 4. The riding roll 36 is rotatably borne, at its opposite ends, in similar carriages 40 (of which only one is shown) which are guided for vertical sliding movement upon vertical tracks 42. These carriages and, with them, the riding roll may be raised and lowered in unison at maintained corresponding levels by suitable, reversible means (not shown) which operate to take up similar cables 44 (one only being shown), fixed to the carriages 40, to raise the latter, and operating to lower the cables 44 to lower said carriages. Although the web may be procesesd in various ways in passing to the rewind core 30, FIG. 1 includes a representation of slitting means for slitting the web longitudinally, said slitting means comprising a rotary knife 46 and a rotary mandrel 48 between which and the knife 46 the web W passes to be slitted during a winding operation.

Although only certain important parts of a winding machine have been hereinbefore detailed, it is believed that those skilled in the web-winding art will readily understand the nature of the winding apparatus with which, and in combination with which, roll-changing apparatus in accordance with this invention is herein disclosed and described.

Roll-changing apparatus according to or as a part of the present invention comprises opposite side stands 50 (FIG. 2) which may be front extensions of lower portions of the side frame members 38 of the winding machine or may be separate uprights closely and rigidly juxtaposed to said side frame members. Suitably borne, at opposite ends, in the stands 50, is a horizontal rock-shaft 52 which is parallel to the several, already-mentioned, rolls of the winding machine. The shaft 52 is rocked by a swing arm 54 which is keyed or otherwise suitably fixed rigidly to one end of said shaft. A link 56 is pivotally connected at its ends between the end of the arm 54 and the end of a crank 58 which is keyed to the power take-off shaft of a motor 60. Thus, unidirectional operation of the motor 60 causes the shaft 52 to rock; and the throw of the crank 58 and the effective length of arm 54 are such as to yield such a degree of rocking action as will contribute properly to operation as hereinafter described.

Similar, directly opposed unload arms 62 are keyed to the rock-shaft 52 toward opposite ends thereof, adjacent to the inner sides of the side stands 50 and said unload arms are formed, at their outer or free ends, with slots 64 which are adapted to receive opposite end bearings 66 of rewind roll 32 after the latter has received its intended quota of web material. Thus, the unload arms function as a yoke or cradle to receive a filled rewind roll and move it from within the winding area to an exterior area of the winding machine in a manner hereinafter described.

The unload arms 62 are similarly provided with end extensions 68 having inner, parallel guideways 70 between which, on each of said arms, is disposed a bearing block 72 which may be adjusted and locked in position in said guideways by screws 73, indicia 75 preferably being provided in upper guideway 70 to aid in coordinating the position of the block 72 with the diameter of a filled rewind roll 32. Within elongate slots 77, in blocks 72 of opposed arms 62, are borne end journals of a web-holding roll 74 which, preferably, is of at least slightly yieldable material, such as rubber, and is driven, as hereinafter explained, to press glued ends of the web on a filled rewind roll.

A brake-shoe 79 on each of arms 62 is spring-biased into and maintained in a braking frictional engagement with a journal of the roll 74 by a spring 76, compressed between the brake-shoe and a cross member 78 which is suitably fixed between guideways 70 toward the ends of the latter. The spring 76 is shown as a coil spring extending about a bolt 80, the inner end of which is threaded into or otherwise fixed to the brake-shoe and the outer end of which extends slidably through a bore 82 in cross member 78. A nut 84 may be threaded upon the end of the bolt 80. The just-mentioned brake arrangement not only suppresses free turning of the roll 74 but also assures that said roll will turn only in the direction in which it is positively driven, as hereinafter explained. Additional means may be provided, if desired, to limit the roll 74 to unidirectional rotation.

A tubular rock-shaft 86 extends horizontally between the inner ends or hub portions 88 of the unload arms 62. The rock-shaft 52 extends through this tubular shaft to serve as a support or bearing for the latter, the arrangement being such that these rock-shafts may rock independently of each other. The means for rocking the tubular shaft 86 are the same, in principle, as the rocking means provided for shaft 52 and comprise a motor 90, a crank 92 on the motor's power take-off shaft, an arm 94 fixed on shaft 86 and a link 96, pivotally connected at opposite ends to the said arm and crank. Adjacent to each end of tubular shaft 86 are substantially similar, directly opposed load arms 98, which, preferably, are somewhat shorter than arms 62. The load arms 98 are rigidly interconnected, at intermediate points thereof, by a cross-bar 100 which is shown as of square shape in cross-section and another cross-bar 102 which is shown as of angular shape in cross-section. The cross-sectional shapes of these cross-bars are not a critical characteristic; they need only be such as to properly and firmly support, respectively, a transverse knife or cutter-bar 104 and a transverse glue brush 106, and to cooperate in the severing of web material in a manner hereinafter explained. The knife may advantageously have a serrated cutting edge 108 (the serrations not appearing in the drawings) and the knife and glue brush may be removably and adjustably mounted on their related cross-bars.

The ends of the load arms 98 are similarly provided each with a fixed jaw 110 and a pivotal jaw 112 which together constitute clamps for holding opposite ends of a rewind core 30 adjacent to the inner sides of the latter's bearings 66. The jaw 112 is pivoted between an open position (full lines in FIG. 1) and a closed position (broken lines in FIG. 5) by a pneumatic cylinder 114 within which works a piston 116 connected by a piston rod 118 and a pivotal link 120 to the jaw 112. Supply of air to cylinder 114 through a flexible tube 122 is controlled by an air valve 124 which is opened and closed by a solenoid coil 126, the two last-mentioned parts being shown only in FIG. 14. In the latter figure, there is also indicated a pipe 128 connecting the valve 124 to a supply of compressed air.

Although the inward swing of the unload and load arms 62 and 98 may be quite accurately limited by proper adjustment of the lengths of links 56 and 96, desirable precision of limitation of such inward swing of said arms may be provided by adjustable stop screws threaded into all said arms in position to abut journal 130 of front drum 28. Such stop screws are shown at 132 and 134, respectively, on arms 62 and 98 in FIG. 1; said screws, respectively, being provided with lock-nuts 136 and 138.

As it will hereinafter appear, it is necessary for a filled rewind roll 32 to be lifted from the winding drums 28 and 34 to enable the slotted ends of unload arms 62 to move into a position beneath the ends or journals of the roll 32 in which the latter may be lowered into the slots 64 preliminary to being removed from the winding machine by said arms. For this purpose, lifting means are provided, as shown in FIGS. 1, 3 and 4, comprising similar, directly opposed lifting cradles 140 for engagement with opposite end bearings 66 of a filled rewind roll.

Each lifting cradle 140 comprises a guide member 142 provided with a vertically extending guide recess 144 which slidably embraces the track 42, always below the carriage 40 which is guided slidably on the same track. Gibs 145 fixed to the member 142 at opposite sides of the recess 144 serve to retain the member 142 in this sliding and guiding association with the track 42; a similar gib arrangement being provided for a similar purpose at the upper end of the previously-described carriage 40 for the riding roll. The guide member 142 extends obliquely downwardly and forwardly of the machine and at its lower end is bolted, or otherwise fixed, a vertical, lifting receiver 146 for receiving one of the bearings 66 of the rewind roll therein vertically and thereafter lifting the rewind roll vertically from the winding drums 28 and 34.

Each receiver 146 comprises a track 148 formed with an inwardly facing groove 150 within which the bearing 66 is slidably received at said track's open upper end. Gibs 152 are suitably fixed to the track 148 at opposite sides of groove 150 to retain the bearing 66 in the latter groove. Across the lower end of the groove 150 is a latch-like bearing supporter 154, pivoted to one side of track 148 at point 156 and yieldably held normally in bearing-supporting position, as shown in full lines in FIG. 3, by a suitable torque spring 158. In this position, supporter 154 supports a bearing 66 above it and, hence, such supporters, functioning similarly at opposite ends of a related rewind roll 32, support the latter in a horizontal position and lift that roll from the winding drums 28 and 34 when the cradles 140 are lifted as hereinafter explained.

Except for the supporters 154, the lower ends of grooves 150 are open so that when the cradles 140 are lowered, as hereinafter explained, the bearings 66 of a newly supplied rewind core 30 enter the lower ends of grooves 150 and contact the supporters 154 which yield upwardly against the force of the springs 158 and move with the descending cradles 140 until the supporters 154 clear the bearings 66 and are forced by springs 158 into underlying, supporting position in relation to said bearings, as shown in FIG. 12.

The lifting cradles 140 are similarly tied slidably to carriages 40, each by a vertical rod 160, the lower end of which extends with a loose fit through a bore 162, in the uppermost of two, spaced, integral lugs 164 of the cradle's guide member 142 with a locked pair of nuts 166 threaded upon the lower end of said rod and disposed between said two lugs. The rod 160 extends upwardly, slidably through and considerably beyond a bore 168 in an integral lug 170 of related riding-roll carriage 40, and a collar 172 is adjustably disposed on said rod, above the lug 170 and provided with a set-screw 174 by means of which said collar may be locked in any adjusted position on said rod.

Thus, when riding-roll carriages 40 are raised with the related riding roll 36, the cradles 140, at first, remain at their lowermost point as in FIG. 12; but, as upward movement of said carriages continues, lugs 170 engage collars 172 on the opposite rods 160, thereby lifting the cradles 140 and, with the latter, a filled rewind roll 32, the bearings 66 of which are supported above the supporters 154 of the lifting cradles. Upon descent of the riding-roll carriages 40, occurring after a new rewind core has been inserted into the winding machine by the load arms 98, the supporters 154 of the lifting cradles latch underneath the bearings 66 of the new rewind core 30 before the riding roll comes to rest upon the new rewind core.

A transverse, web-deflecting roll or bar 176, for deflecting the web against the knife 104 in a web-severing operation hereinafter described, is similarly supported at each of its opposite ends on a swing arm 178 which is pivoted at point 180 to riding-roll carriage 40. Arm 178 is formed with a slide recess 182 in which a slide 184 is slidably adjustable and lockable by a lock screw 186 to vary the effective over-all length of the arm 178. Opposite ends or end journals of the roll or bar 176 are supported in the lower ends of the slide 184.

A horizontal, transverse, glue trough 188, carrying an adequate supply of liquid glue 190, is rigidly supported in any suitable manner toward the front of the machine, as, for example, by a cross member 192, the opposite ends of which are welded, bolted or otherwise suitably fixed into side stands 50. Extending longitudinally in said trough and dipping substantially into the glue therein is a continuously rotatable, primary glue roll 194, preferably of rubber, end journals of which roll are supported in suitable bearings 196 at opposite ends of the trough 188. One end journal 198 of the glue roll, as shown in FIG. 6, extends beyond the adjacent bearing 196 and a pulley-wheel 200 is suitably keyed or otherwise fixed upon said journal. A belt 202, continuously driven by a motor (not shown), runs about a pulley-wheel 204, keyed on a shaft 206, rotatably borne in stand 50 to turn said shaft and another pulley-wheel 208 which is keyed to the same shaft. A belt 210 working on pulley-wheels 208 and 200 causes the latter wheel and its related glue roll 194 to turn continuously.

As best seen in FIG. 5, a secondary, horizontal glue roll 212, preferably of rubber, is held in parallelism with and normally in rolling contact with primary glue roll 194. The roll 212 is similarly supported at its opposite ends in the manner shown in FIG. 5, wherein it is seen that the end of the roll 212 is journaled in the upper end of an arm 214 which is pivoted at its lower end at a point 216 on stand 50 or a member fixed thereto. Integral with arm 214 and extending laterally therefrom is a short arm 218 having a yieldable abutment bolt 220 extending with a sliding fit through a bore 222 in said short arm. A short coil spring 224, extending about the bolt 220, is compressed between the latter's head and an adjacent upper face of the arm 218 and a pair of adjustable locking nuts 226 is threaded upon the end of the bolt 220 and abuts an adjacent lower face of the arm 218.

The secondary glue roll 212 is spring-biased normally toward and into rolling engagement with primary glue roll 194 by a spring 228, the ends of which are hooked to lugs 230 and 232 on arm 214 and on the stand 50 or a member fixedly associated therewith. At the start of a roll-changing operation, as hereinafter described, a finger 234 on load arm 98 momentarily presses against the head of bolt 220 and thereby momentarily swings arm 214 inwardly to cause secondary glue roll 212 momentarily to engage and apply a line of glue along the length of a new rewind core 30 then being held by the load arms 98, preparatory to being moved into the winding machine.

Driving means are provided to turn web-holding roll 74 which presses glued ends of the web firmly upon an underlying turn of web material on a filled rewind roll 32 upon the latter being brought out of the machine by the unload arms 62. These driving means comprise a continuously driven drive-wheel 236 having a knurled periphery which, as best seen in FIG. 5, engages the surface of roll 74 and frictionally turns the latter when the unload arms are in their "out" positions. As best shown in FIG. 6, the wheel 236 is keyed upon one end of a shaft 238 which is rotatably supported within a bore 240 in a bearing member 242 which is integral with the upper end of an upright arm 244 of which a hub portion 246 at said arm's lower end is supported pivotally on the shaft 206.

The arm 244 is spring-biased leftwardly (as viewed in the drawings) by a tension spring 248 to an extent limited by abutment of said arm with cross member 192 or other suitable stop means. The spring 248 is connected at its ends to a lug 250 on the arm 244 and to a lug 252 on stand 50 or a member fixed to said stand. A belt 254 is arranged to work on a pulley-wheel 256 keyed to continuously running shaft 206 and on a pulley-wheel 258 keyed on shaft 238 whereby to continuously turn wheel 236.

The operation of various parts of the disclosed apparatus is achieved by electrical means or under electrical control. Said operating and control means are indicated in the electrical diagram of FIG. 14. In that diagram are indicated several motor-controllers which are more or less conventional and include certain relays which are not shown, as such a showing is not necessary to afford a complete understanding of this invention to those skilled in this art. Certain other relays are shown by indicating their relay coils in their proper places in circuits and by showing their various contactors separately in their proper places in circuits. One referring to FIG. 14 should understand that relay contactors are correlated with their operating coils by giving the coils reference letters and by giving each coil's related contactors a reference character consisting of the letter of the related operating coil followed by a characterizing number. This cooperating relationship between relay coils and the contactors operated by said coils is additionally indicated by broken lines leading from each relay coil to the one or more contactors operated by said coil. For example, relay coil A operates relay contactors A1, A2 and A3, from each of which broken lines lead to coil A in FIG. 14.

Certain mechanically operated switches, hereinafter described as limit switches, are indicated in FIG. 14 by a numeral preceded by the letters LS. Some of these limit switches have multiple but simultaneously operated switch members for functioning in different circuits. Where a given limit switch has plural switch members, they are shown separately in FIG. 14, but their interrelationship is shown by using the same numeral in the reference characters of all interrelated switch members followed by different letters for the different switch members. Thus, for example, LS1A is used to indicate one switch member in a dual-member switch, the designation LS1B being used to indicate the other switch member in the same switch.

In FIG. 14, the various limit switch members and relay contactors are shown as open if those members and contactors are open normally as when the switch is not being mechanically operated, or as when related relay coils are in deenergized condition. It should be noted that some of the limit switches operate only in one direction, while at least one of such switches (LS3 for example) operates in opposite directions. In the just-stated respect, the switches selected for use in this invention should be such as to yield operation as hereinafter described, such selection being well within the capabilities of persons skilled in this art.

In FIG. 1, limit switches LS6 to LS13 inclusive are indicated as positioned about the paths of movement of cranks 58 and 92 which, respectively, operate the unload arms and the load arms, said switches being actuated either directly by said cranks or by cams or lugs constrained to turn with said cranks. In FIG. 3, limit switches LS1 to LS5 inclusive are indicated as positioned along the paths of movement of riding-roll carriage, or carriages, 40 and one of the rewind-roll lifting cradles 140. The switches LS1, LS2, LS3 and LS5 are all shown in operative relationship to a single one of the two riding-roll carriages 40, but obviously some of said switches could be operated by one of the carriages 40 while others could be operated by the other of said carriages.

In FIG. 3, a lug 260 may be provided on riding-roll carriage 40 for operating switches LS1A and B, LS2 and LS3 and a second lug 262 may be provided on said carriage for operating switch LS5A and B. Similarly, a lug 264 may be provided on one of the cradles 140 for operating switch LS4A and B. Because of the diagrammatic and broken natures of FIGS. 1 and 3, the positions of the limit switches shown therein should not be considered to be exact. The proper positions of said switches may be better ascertained from their designations in FIG. 13 and said positions, of course, should be such as to yield operation as hereinafter detailed.

In referring to FIGS. 13 and 14 in connection with the following operational description, it should be noted that viewing FIG. 13, from left to right, enables one to correlate the movements of certain moving parts of the apparatus to the winding time and the roll loading and unloading time. In FIG. 14, hereinafter mentioned circuits are shown each including wires (unnumbered lines) interconnecting certain electrical instrumentalities, and the lines of each of such circuits are shown, for the most part, as horizontal lines extending between electric supply lines shown as vertical lines marked + and − at opposite sides of said figure.

The operation of the roll-changing apparatus of this invention, as illustrated herein, commences when winding of web material has been completed to bring a rewind roll 32 in the winding machine to a predetermined thickness or, i.e., to an extent that the desired amount of web material has accumulated on said rewind roll. During this winding operation an operator or operators have manually removed a previously filled rewind roll from the slots 64 of the unload arms 62 and have manually placed a new rewind core 30 between the jaws 110, 112 of the load arms 98; said unload arms being at their "full out" positions and the load arms being at "normal out" positions during the winding operation. Certain conditions upon commencement of the roll-changing operation are indicated at point AA in FIG. 13, when winding of the rewind roll 32 has been completed. At that point, the increased thickness of filled rewind roll 32 has caused that roll's carriage 40 to rise sufficiently to cause lug 260 to operate switch LS1 to open switch contact LS1B and close switch contact LS1A (such contacts in various switches, and also relay contactors, being referred to hereinafter by the reference characters applied thereto in FIG. 14). The opening of LS1B breaks a pre-existing circuit through previously closed WM1 and winding motor-controller WM, causing the latter to slow down and stop the winding motor and, hence, the winding operation of the machine.

The mentioned closing of LS1A energizes relay coil A which is part of a time-delay relay, thereby instantaneously closing A1 to provide a holding circuit around LS1A and causing slightly delayed closing of A3 and slightly delayed opening of A2 to cause operations indicated at point BB of FIG. 13. At that point, opening of A2 deenergizes coil 126 to operate air valve 124 to cause air cylinders 114 to close jaws 112 upon the new rewind core held by load arms 98; and closing of A3, in a circuit through LS3, C1 and the "up" portion of riding-roll motor-controller R causes the riding-roll carriage 40 to commence ascending with said roll from the filled rewind roll 32. The delay in operation of A3 and A2 is the same as or slightly greater than the deceleration and stopping of the winding motor.

At point CC, FIG. 13, shortly after carriage 40 starts to ascend, lug 260 closes LS2 to complete a circuit through LS7A and relay coil Y to energize the latter and thereby close Y2 to provide a holding circuit around LS2 and close Y1 to cause unload arms' motor-controller U to start motor 60 and thereby start unload arms 62 pivoting inwardly.

At point DD, FIG. 13, when the unload arms part way into the machine, crank 58, or a lug thereon or operated thereby, closes LS6 to complete a circuit through LS10 and relay coil Z to energize the latter and thereby close Z2 to provide a holding circuit around LS6 and close Z1 to cause load arms' motor-controller L to start motor 90 and thereby start operation of load arms 98, the unload arms, meanwhile, continuing their inward movement.

At the commencement of the just-mentioned operation of the load arms, they are in a "normal-out" position slightly inward of "full out" position. At this commencement of operation, crank 92, which had not quite completed a previous down stroke, completes that stroke, thereby causing the load arms 98 to recede slightly to their "full out" position, the effect of which is to apply a longitudinal line of glue to the new rewind core 30 which is then held by the load arms. As shown in FIG. 5, receding of load arms 98 from "normal out" (full line) position to "full out" (broken line) position not only causes rewind core 30 to move toward secondary glue roll 212 but, through slight rocking of arm 214 by coaction of finger 234 with bolt 220, causes glue roll 212 to move toward the rewind core, thereby contacting the latter and applying glue thereto. Uninterrupted further turning of crank 92 causes the load arms to move inwardly and permits roll 212 to resume its normal position in contact with primary glue roll 194.

At point EE, FIG. 13, the riding-roll carriage 40 completes its intended motor-caused ascent, whereupon lug 260 shifts LS3 from its full-line position to its broken-line position of FIG. 14, thereby opening the pre-existing circuit through the "up" portion of motor-controller R to terminate the ascent of carriage 40 and riding roll 36 and establish a circuit through relay coil C to energize the latter. The energized coil C opens C1, providing an additional break in the mentioned pre-existing circuit through controller R, and closes C2 to hold the circuit through relay coil C (thereby keeping C1 open) until opening of A3 and closing of C1 at a later point of operation as hereinafter described.

When carriage 40 is at its uppermost position as described in the next preceding paragraph, the lifting cradles 140, lifted by carriages 40 and rods 160, and with supporters 154 beneath the bearings 66 of the filled rewind roll 32, have ascended and hold the latter roll at such elevated position, indicated in FIG. 9, as to give clearance thereunder for the new rewind core 30 to be carried by the then in-moving load arms 98 fully into the winding machine and to enable the slots 64 of the then in-moving unload arms 62 to move into position directly below the journals of the filled rewind roll 32, all as more fully hereinafter explained.

At point FF, FIG. 13, unload arms 62 substantially complete their inward movement somewhat in advance of still inwardly moving load arms 98, whereupon crank 58 causes LS7A to open and LS7B to close. Opening of LS7A opens the circuit through Y2 and relay coil Y to deenergize the latter, thereby opening Y1 and Y2. This opening of Y1 opens the circuit therethrough and through motor-controller U, thereby causing the latter to stop motor 60 to bring the unload arms to rest beneath and in vertical alignment with the end journals of the then elevated filled rewind roll 32; the precision of this stopping being additionally assured by abutment of stop screws 132 on the unload arms with the journals 130 of front winding drum 28. The mentioned opening of Y2 merely opens the pre-existing holding circuit around LS2. The mentioned closing of LS7B completes a circuit through LS4A and the "down" part of motor-controller R to cause the latter to operate the motor of the riding-roll carriages 40 to cause the latter, with riding roll 36 and cradles 140, to start moving downwardly with the filled rewind roll 32 which is still held in said cradles. The correlation of switch contacts LS1A and LS1B with their operating arm and with lug 260 is such that as said lug moves downwardly with carriages 40, it re-closes LS1B and opens or leaves LS1A open.

At point GG, FIG. 13, shortly after the riding-roll carriages 40 and related parts have started downwardly as just mentioned, the load arms 98, with the new rewind core 30, substantially complete their inward movement, whereupon crank 92 causes LS10 to open, thereby breaking the circuit through Z2 and relay coil Z to deenergize the latter and thereby open Z1 and Z2. Opening of Z2 breaks the pre-existing holding circuit around LS6 and opening of Z1 breaks the circuit therethrough to motor-controller L to cause the latter to stop motor 90 to bring the load arms to rest with the new rewind core 30, carried by the load arms, in its proper winding position in the machine, on and supported by the winding drums 28 and 34. The precision of this stopping is additionally assured by abutment of stop screws 134 on the load arms 98 with the journals of front winding drum 28. As the rewind core 30 completes its described movement into the machine, it deforms the web W from its FIG. 9 condition approximately to its FIG. 10 condition.

At point HH, FIG. 13, while the load and unload arms are still in their "full in" positions, the downward movement of the riding-roll carriages 40, with the cradles 140 and the filled rewind roll 32 in the latter, has progressed sufficiently to lower the roll 32 to seat its bearings 66 in the then underlying slots 64 of the unload arms 62 and to lower the cradles 140 still further so that the upper ends of the latter are substantially clear of the bearings 66 of the filled rewind roll. This condition, with respect to roll 32, is shown in FIG. 10. Upon this described partial descent of the cradles 140, plug 264 opens LS4A and closes LS4B. Opening of LS4A breaks the circuit throught LS7B and motor-controller R to cause the latter to stop the motor of the riding-roll carriages 40 to interrupt the descent of the latter. Closing of LS4B completes a circuit through LS8A and motor-controller U to cause motor 60 to start the unload arms 62 moving outwardly with the filled rewind roll 32; the roll or bar 176, meanwhile, pivoting upwardly while resting on the surface of the filled rewind roll.

At point II, FIG. 13, as the unload arms 62 approach approximately a midposition in their outward movement, crank 58 causes LS13 to open, thereby opening the circuit through A1 and relay coil A to deenergize the latter. During the just-mentioned outward movement of the unload arms, the filled rewind roll clears the roll or bar 176, permitting the latter to drop back to its position shown in FIG. 11. The deenergizing of coil A causes A1 and A3 to open and A2 to close. Opening of A1 breaks the holding circuit around LS1A, and opening of A3 breaks the circuit through C2 and relay coil C to deenergize the latter and cause opening of C2 and closing of C1 to condition the circuits related to coil C for operation again in a subsequent roll-changing operation. Closing of A2 restores the previously broken circuit through coil 126 of air valve 124 to operate the latter to cause air cylinder 114 to open jaws 112 to leave the new rewind core 30 freely in its winding position.

At point JJ, FIG. 13, shortly after the just-described operation of LS13, and about concurrently with the opening of jaws 112, and about as the unload arms 62 reach a "half out" position while the load arms are still "full in" as in FIG. 11, crank 58 causes LS8A to open and LS8B to close. Opening of LS8A breaks the circuit through LS4B and motor-controller U, causing the latter to stop motor 60 and thereby stop the outward movement of unload arms 62 in their "half out" position, so that the web W, the rolls 30 and 32 and the arms 62 and 98 are approximately in their positions shown in FIG. 11. Closing of LS8B completes a circuit through LS5A and the "down" portion of motor-controller R, whereby the latter causes the starting of the motor of the riding-roll carriages 40 to cause the latter and lifting cradles 140 to resume and complete their descent while the core 30 and rewind roll 32 remain substantially as shown in FIG. 11.

The effect of the just-mentioned further descent of the carriages 40 may best be understood from FIGS. 11 and 12. Associated with and moving vertically downwardly with the riding roll, and its carriages 40, are the swing arms 178 supporting the web-deflecting roll or bar 176. In this downward movement, the roll or bar 176 engages the web W about midway between rolls 30 and 32 and deflects the web sharply against the cutting edge 108 of the knife 104 as shown in FIG. 12 to transversely cut the web; the roll or bar 176 coming down upon the then upper surface of cross-bar 100 and rolling or sliding outwardly or rightwardly thereon, as viewed in FIG. 12, with an accompanying outward swing of the arms 178, to assure that the web will engage the glue brush 106 to receive a transverse line of glue thereon, shown at 266 in FIG. 5.

It will be noted that, during the just-described descent of the carriages 40, the lifting receivers 146 of the cradles 140 move downwardly into direct association with bearings 66 of the new rewind core 30 until, in approaching their lowermost position, shown in FIGS. 1, 3 and 12, the spring-pressed latches or supporters 154 first yield upwardly to enable them to pass the bearings 66, after which, in response to their springs 158, they snap back into supporting position underneath said bearings in readiness to lift the adjacent rewind core 30 in a repeat roll-changing operation after said core has received the intended amount of web material thereon in the next following winding operation.

At point KK, FIG. 13, upon carriages 40 reaching their "full down" position with riding roll 36 resting upon new rewind core 30, as in FIG. 12, lug 262 opens LS5A and closes LS5B. The opening of LS5A breaks the circuit through LS8B to the "down" portion of motor-controller R, thereby causing the latter to stop the motor which actuates the carriages 40. The closing of LS5B completes a circuit through LS12B and motor-controller L, thereby causing the latter to start motor 90 to move load arms 98 outwardly; the bar or roll 176, meanwhile, pivoting upwardly with the load arms until it clears cross-bar 100, whereupon it drops back to depend from riding-roll carriages 40 and rest upon drum 28 with the leading end of the web W between the roll 176 and said drum as shown in FIG. 7.

At point LL, FIG. 13, when the load arms reach a position about halfway out, crank 92 causes LS11 to close and complete a circuit through LS1B and winding-motor controller WM to cause a relay coil (not shown) in said controller to be energized and to cause said controller to start the winding motor to rotate the drums 28 and 34 and thereby start a new web-winding operation. As the then leading end of web W in the machine is firmly held down on the new rewind core 30, and upon drum 28, this resumed rotation of the drums 28 and 34 causes the web to start winding on said core which, as already explained, had a line of glue applied thereto before being moved into the machine. Upon this commencement of the winding operation, the part 176, if a bar, increases the web's frictional engagement with the drum 28 so that the latter pushes the leading end of the wed inwardly to tuck it between the drum 28 and the core 30 to cause the web to start winding on the latter. If the part 176 is a rotatable roll, it turns with the drum 28, similarly tucking the web in to start it winding on said core. Regardless of whether the part 176 is a bar or a roll, that part may be arranged to block the space between riding roll 36 and drum 28 to assure the mentioned tucking-in of the web to start it winding on said core. The energizing of said relay coil in the controller WM causes WM1 to close a holding circuit around LS11.

At point MM, FIG. 13, as the load arms 98 approach their "normal out" position, crank 92 causes LS12A to close and LS12B to open. The opening of LS12B breaks the circuit through LS5B and motor-controller L to cause the latter to stop the outward movement of the load arms at their "normal out" position in readiness for a subsequent roll-changing operation. The closing of LS12A completes a circuit through LS9 and relay coil X to energize the latter and thereby cause X2 to close a holding circuit around switch LS12A and to cause X1 to close to complete a circuit through motor-controller U to cause the latter to restart motor 60 and thereby cause the unload arms 62 to resume their outward movement with the filled rewind roll 32. It should be noticed that, during the outward movement of the load arms 98, the glue brush 106 wipes against secondary glue roll 212 to replenish its supply of glue.

At point NN, FIG. 13, as the unload arms approach their "full out" position, crank 58 causes LS9 to open and break the circuit through X2 and relay coil X, to de-energize the latter, causing X2 to open and also causing X1 to open, to break its circuit through motor-controller U and thereby stop motor 60, to bring unload arms 62 to rest in their "full out" position. Upon arrival of the unload arms at this position, web-holding roll 74, as shown in FIG. 5, comes into contact with the knurled periphery of drive-wheel 236 and is turned by the latter to turn rewind roll 32 to press the web end thereon and cause it to adhere, at glue line 266, to the underlying web on the rewind roll.

At the point NN both the load arms 98 and the unload arms 62 are in "out" positions at which the operator or operators of the machine may remove the filled rewind roll 32 from the arms 62 and insert another rewind core 30 in the arms 98 in preparation for an ensuing roll-changing operation. This activity by the operators is accomplished while winding of web material progresses upon the rewind roll 32 which is then in winding position in the machine. When the desired amount of web material accumulates on the rewind roll 32 then in the machine, another automatic roll-changing operation takes place as hereinbefore described.

It should be observed that the various limit switches, particularly those responding to vertical movements of the carriages 40 and/or the cradles 140, should be arranged to operate as hereinbefore described. Thus, for example, one or more switches may be arranged to be reset on downward movement of the carriages 40 as already explained, for example, with reference to LS1B while the operating arms of other switches actuated by lugs on carriags 40 or cradle 140 may be so arranged or adapted that, while said arms may be swung by such lugs upon downward movement of said carriage or cradle, such swinging either would operate related switch contacts only momentarily or without any continuing effect upon related circuits.

It should be understood, also, that mechanisms according to this invention may be arranged to function under somewhat different timing arrangements than herein described, while still achieving operating effects and results substantially as described.

Likewise, it should be obvious that the instrumentalities constituting this invention may be somewhat different from those disclosed herein without, however, departing from the invention as set forth in the accompanying claims.

I claim:

1. A web-roll changing mechanism for a winding machine, comprising a pair of spaced, rigidly interconnected load members adapted to carry a rewind core therebetween, means for supporting said load members adjacent to said machine, load-member actuating means coacting with said load members to move the latter back and forth between a rewind-core receiving position exteriorly of said machine and a position corresponding to a winding position of a rewind core in said machine, a pair of spaced, rigidly interconnected unload members adapted to carry a rewind roll therebetween, means for supporting said unload members adjacent to said machine, and unload-member actuating means, separate from said load-member actuating means, coacting with said unload members to move the latter back and forth between a position corresponding to a pick-up position of a rewind core in said machine, distal from said winding position, and a roll delivery position exteriorly of said machine; said load members and unload members being pivotable, independently of each other, about a common axis between their respective mentioned positions, a rewind roll in said roll pick-up position having a web portion leading thereto in interfering position in relation to the path of a rewind core between said core-receiving position and said winding position, and said mechanism further including a glue-applying means and a knife carried by said load members and positioned, respectively, to engage and apply glue to said web portion and to engage and sever said web portion at a point on the latter farther from said rewind roll than the applied glue.

2. A mechanism according to claim 1, further including web-pressing means adjacent to a rewind roll held by said unload members in said roll delivery position for pressing the glued web portion upon said rewind roll.

3. A mechanism according to claim 2, further including glue-applying means adjacent to a rewind core held by said load members in said core-receiving position and adapted to apply glue to said core prior to movement of the latter from said core-receiving position by said load members.

4. A mechanism according to claim 2, said web-pressing means comprising a web-holding roll supported rotatably upon said unload members in position to press against the surface of a filled rewind roll carried by the unload members, and a driving wheel supported in position to engage and turn said web-holding roll when said unload members are in their outermost positions in relation to said machine.

5. A mechanism according to claim 4, said web-holding roll and said driving wheel being yieldable.

6. A mechanism according to claim 4, said web-holding roll being adjustable to different positions upon said unload members to enable its use with different sizes of filled rewind rolls.

7. A web-roll changing mechanism for a winding machine, comprising a pair of spaced, rigidly interconnected load arms adapted to carry a rewind core toward the ends of and between said arms and being pivotable between a core-receiving position alongside of said machine and a core-winding position in said machine, and a pair of spaced, rigidly interconnected unload arms adapted to carry a rewind roll toward the ends of and between the latter arms and being pivotable between a rewind-roll pick-up position in said machine, spaced from said core-winding position, and a rewind-roll delivery position alongside of said machine; said pairs of arms being pivotable, independently of each other, about a common axis and being in non-interfering relation to each other in their said pivotal movements, said roll pick-up position being spaced upwardly from said core-wnding position, and the mechanism further including roll-shifting means adapted to shift a rewind roll from said winding position to said pickup-position, and coacting actuating means for operating said pairs of arms and said roll-shifting means in such timed relationship as to cause said load arms to carry a rewind core to said winding position following shifting of a rewind roll, by said roll-shifting means, from said winding position to said pick-up position.

8. A mechanism according to claim 7, said pick-up position being in such relation to said winding position that a web portion extending onto a rewind roll in said pick-up position is in interfering relation to the path of a rewind core carried by said load arms in the latters' pivotal movement to said winding position, the mechanism further including adhesive-applying means adjacent to a rewind core carried between said load arms in the latters' said core-receiving position, for applying adhesive to such a rewind core to enable adhesion thereto of said interfering web portion, and web-cutting means and operating means for the latter; said web-cutting means being disposed for cutting engagement with said web between said pick-up and winding positions and said latter operating means being arranged to coact in timed relation with said actuating means for said pairs of arms and for said roll-shifting means to cause said cutting means to cut said web portion between the rewind roll at said pick-up position and the rewind core at said winding position subsequent to shifting of said rewind roll from said winding position to said pick-up position.

9. A web-roll changing mechanism for a winding machine wherein a rewind roll is supported in winding position in the machine between a pair of winding drums and turns with said drums to accumulate web material thereon, said mechanism comprising lifting means adapted to engage a rewind roll in said winding position and raise said rewind roll from said winding position approximately to a distal pick-up position in the machine, a reciprocable unload member adapted to receive said rewind roll at said pick-up position and carry said rewind roll to a delivery position exteriorly of said machine, a reciprocable load member adapted to receive a rewind roll at a position exteriorly of the machine and carry the last-mentioned rewind roll to said winding position, and actuating means coacting with said members to impart said movements thereto; said members being pivotally reciprocable, independently of each other, about a common axis and arranged to reciprocate in non-interfering paths.

10. A web-roll changing mechanism according to claim 9, said actuating means including separate parts coacting separately with said unload and load members, and said separate parts being operable independently of each other.

11. A web-roll changing mechanism according to claim 9, said lifting means comprising a vertically movable lifting receiver having a latch adapted to yield upon downward movement thereof past a rewind roll in the machine, said latch being engageable unyieldingly beneath said rewind roll to lift the latter upon upward movement of said receiver.

12. A web-roll changing mechanism according to claim 11, said winding machine including a riding roll, resting upon a rewind roll during winding of web material thereon when said rewind roll is in said winding position, said riding roll being elevatable from said rewind roll and said mechanism including a link interconnecting the rewind roll and said lifting receiver, and means for elevating said riding roll whereby to raise said lifting receiver and thereby raise said rewind roll from said winding position to said pick-up position.

13. A web-roll changing mechanism according to claim 12, said lifting receiver being operable to be lowered from a raised position to deposit a rewind roll, held thereby, on said unload member and to continue downwardly to a position clear of the deposited rewind roll to permit movement of the latter from the machine by said unload member.

14. A web-roll changing mechanism according to claim 12, said winding machine further including a riding-roll carriage supporting said riding roll, said link interconnecting said carriage and said lifting receiver, and said mechanism further comprising electrical means for vertically moving said carriage and receiver and for moving said unload and load members into and out of the machine, electric switches coacting with said carriage, receiver and unload and load members to derive switch operation therefrom and coacting with said electrical means to control said movements of said carriage, receiver and unload and load members.

15. A web-roll changing mechanism for a winding machine wherein a rewind roll is supported in winding position in the machine between a pair of winding drums and turns with said drums to accumulate web material thereon, said mechanism comprising lifting means coacting with a web-filled rewind roll to lift the latter from said winding position approximately to a pick-up position, a pivotal unload member adapted to carry said web-filled rewind roll from said pick-up position to a delivery position exteriorly of the machine, a pivotal load member adapted to carry a rewind core from a receiving position exteriorly of the machine to said winding position, cutting means on said load member, and glue-applying means on said load member, the two last-mentioned means being respectively adapted to cut and apply glue to a portion of web material which extends between a web-filled rewind roll and said drums when the latter rewind roll is at said pick-up position.

16. A web-roll changing mechanism according to claim 15, further including web-deflecting means, operable when the web-filled rewind roll is approximately in said pick-up position and when the rewind core is in said winding position, to deflect an intervening portion of the web extending between said roll and core into engagement with said glue-applying means to cause glue to be applied to the web and into cutting engagement with said cutting means to sever the web.

17. A web-roll changing mechanism according to claim 16, said web-deflecting means comprising a vertically movable bar, approximately parallel to said winding drums and in interfering relationship with said intervening portion of the web and being adapted to engage the latter web portion upon downward movement of the bar to push the latter web portion against said glue-applying means and said cutting means.

18. A web-roll changing mechanism according to claim 16, the winding machine including a riding roll resting upon a rewind roll during accumulation of web material thereon during a winding operation, said riding roll being vertically movable to positions above and clear of the last-mentioned rewind roll, and said web-deflecting means comprising a bar, connected to said riding roll to adapt it to move vertically with said riding roll, said bar being in vertical alignment with said intervening web portion and adapted to contact the latter web portion and deflect it against said glue-applying means and against and angularly about said cutting means.

19. A web-roll changing mechanism according to claim 16, said web-deflecting means comprising a cross-member adapted to engage a leading end of a web, upon commencement of a winding operation, to tuck it partially about said rewind core.

20. A web-roll changing mechanism according to claim 19, said cross-member being a rotatable roll arranged to engage said leading web-end between it and one of said winding drums and to turn with said one drum to push the web toward said rewind core and tuck it partially about said core.

21. A web-roll changing mechanism for a winding machine wherein a rewind roll is supported in winding position in the machine between a pair of winding drums and turns with said drums to accumulate web material thereon, said mechanism comprising lifting means coacting with a web-filled rewind roll to lift the latter from said winding position approximately to a pick-up position, a pivotal unload member adapted to carry said web-filled rewind roll from said pick-up position to a delivery position exteriorly of the machine, a pivotal load member adapted to carry a rewind core from a receiving position exteriorly of the machine to said winding position, glue-applying means comprising a glue roll adjacent to a rewind core carried by said load member, shifting means for moving said rewind core and glue roll into glue-applying engagement in an initial part of a roll-changing operation, and a glue brush on said load member in position to wipe upon said glue roll to receive glue therefrom upon pivotal movement of said load member.

22. A web-roll changing mechanism according to claim 21, said glue roll being rotatable and constituting a secondary glue roll, and said glue-applying means further comprising a rotatable, primary glue roll in a glue bath, a pair of arms supporting said secondary glue roll and holding the latter yieldably against said primary glue roll to derive rotation therefrom and to receive glue therefrom, said shifting means comprising a member integral with said load member and adapted, upon movement of the latter toward said secondary glue roll, to coact with said pair of arms to shift said secondary glue roll away from said primary glue roll and toward and into glue-transferring engagement with a rewind core carried by said load member.

23. A web-roll changing mechanism for winding machines, comprising an unload member and a load member, both said members being pivotal between positions in and out of the winding machine, a vertically movable, lifting receiver adapted to engage a rewind roll in winding position in the machine and move said rewind roll to a higher, pick-up position in the machine, a cutting knife and glue brush on said load member, a vertically movable web-deflecting member adapted, on downward movement thereof, to press a web portion, extending from a web-filled rewind roll, against said brush to apply glue to the web and against said knife to sever the web, and a pressing roll, on said unload member, adapted to press an end of a severed web upon a filled rewind roll carried on the latter member.

24. A web-roll changing mechanism according to claim 23, further including a glue roll adjacent to a rewind core carried by said load member, in the latter's position out of said machine, and adapted to apply glue to said rewind core, said brush being so positioned on said load member as to wipe against said glue roll upon movement of the latter arm into and out of said machine, and the mechanism further including a driving roll coacting with said pressing roll to turn the latter when the unload member is out of the machine.

25. A web-roll changing mechanism for a winding machine having a rotatable winding drum adapted frictionally to turn a rewind core, in winding position in engagement with said drum, to wind web material onto said core, said mechanism comprising a pair of spaced, rigidly interconnected, movable load members, supported adjacent to said drum and adapted to carry a rewind core therebetween from a core-receiving position, clear of and at one side of said drum, to said winding position, core-shifting means for shifting a web-filled rewind core upwardly from said winding position to a pick-up position in which the web-filled rewind core is spaced from said drum to an extent greater than the thickness of a rewind core, and a pair of spaced, rigidly interconnected, movable unload members, supported adjacent to said drum and adapted to support and carry a web-filled rewind core from said pick-up position to a delivery position adjacent to said machine; said load members being timed to carry a rewind core to said winding position subsequent to upward shifting of a web-filled rewind core from said winding position by said core-shifting means, and said unload members being timed to carry a web-filled rewind core from said pick-up position subsequently to the carrying of said rewind core to said winding position by said load members.

26. A web-roll changing mechanism for a winding machine having a rotatable winding drum adapted frictionally to turn a rewind core, in winding position, in engagement with said drum, to wind web material upon said core; said mechanism comprising a pair of spaced, rigidly interconnected, movable load members, supported adjacent to said drum and adapted to carry a rewind core therebetween from a core-receiving position, clear of and at one side of said drum, to said winding position, core-shifting means adapted to lift a web-filled rewind core from said winding position to a lifted position in which the web-filled rewind core is spaced from the drum to an extent greater than the thickness of a replacement rewind core to permit subsequent movement of a replacement rewind core, by said load members, between the lifted core and the drum, to said winding position, severing means on said load members, operative after a replacement rewind core has been thus moved to said winding position, for severing web material extending between the lifted core and said replacement rewind core, and core-removing means adapted to support the web-filled rewind core independently of said drum and to move the latter core from its said lifted position to a core-delivery position toward one side of said drum.

27. A web-roll changing mechanism for a winding machine, comprising a first pair of spaced, rigidly interconnected, pivotal load-supporting arms adapted by their pivotal movement to carry a rewind core from a core-receiving position alongside of said machine to a core-winding position in said machine, upwardly movable core-elevating means including latch means arranged to engage a rewind core when the latter is in said core-winding position, said core-elevating means, by its movement, being adapted to elevate the engaged core from said core-winding position to a pick-up position, and a second pair of spaced, rigidly interconnected, pivotal load-supporting arms adapted by their pivotal movement to carry a rewind core from said pick-up position to a discharge position alongside of said machine.

References Cited in the file of this patent

UNITED STATES PATENTS

| | | |
|---|---|---|
| 1,613,381 | Cameron | Jan. 4, 1927 |
| 1,934,913 | Crisp | Nov. 14, 1933 |
| 1,949,997 | Fourness | Mar. 6, 1934 |
| 1,979,310 | Berry | Nov. 6, 1934 |
| 2,740,592 | Larsen et al. | Apr. 3, 1956 |
| 2,759,678 | Goddard | Aug. 21, 1956 |
| 2,877,959 | Aaron et al. | Mar. 17, 1959 |
| 2,914,267 | Means | Nov. 24, 1959 |